(12) United States Patent
Andreev et al.

(10) Patent No.: US 7,181,563 B2
(45) Date of Patent: Feb. 20, 2007

(54) FIFO MEMORY WITH SINGLE PORT MEMORY MODULES FOR ALLOWING SIMULTANEOUS READ AND WRITE OPERATIONS

(75) Inventors: Alexander E. Andreev, San Jose, CA (US); Anatoli A. Bolotov, Cupertino, CA (US); Ranko Scepanovic, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 455 days.

(21) Appl. No.: 10/692,664

(22) Filed: Oct. 23, 2003

(65) Prior Publication Data

US 2005/0091465 A1 Apr. 28, 2005

(51) Int. Cl.
*G06F 12/00* (2006.01)

(52) U.S. Cl. .......................... 711/5; 711/150; 711/167; 711/168; 711/169

(58) Field of Classification Search ...................... None
See application file for complete search history.

(56) References Cited

U.S. PATENT DOCUMENTS 5,084,841 A 1/1992 Williams et al. ....... 365/189.07
5,086,346 A * 2/1992 Fujisawa ..................... 358/453
5,471,583 A 11/1995 Au et al. ..................... 395/250
5,663,910 A 9/1997 Ko et al. ................ 365/189.05
5,974,482 A 10/1999 Gerhart ........................ 710/52
2003/0034797 A1 2/2003 Bentz ........................... 326/38

OTHER PUBLICATIONS

Microsoft Computer Dictionary, Copyright 1999, Microsoft Press, Fourth Edition, pp. 159, 372, 423.*

* cited by examiner

*Primary Examiner*—Sanjiv Shah
*Assistant Examiner*—Midys Rojas
(74) *Attorney, Agent, or Firm*—Suiter Swantz PC LLO

(57) ABSTRACT

The present invention is directed to a FIFO memory with single port memory modules that may allow simultaneous read and write operations. In an exemplary aspect of the present invention, a method for employing a FIFO memory with single port memory modules of half capacity to perform simultaneous read and write operations includes the following steps: (a) providing a first single port memory module for an even address of a read or write operation; (b) providing a second single port memory module for an odd address of a read or write operation; (c) alternating even address and odd address; and (d) when both a read request and a write request reach either the first single port memory module or the second single port memory module at a clock cycle, fulfilling the read request at the current clock cycle and fulfilling the write request at the next clock cycle.

9 Claims, 2 Drawing Sheets

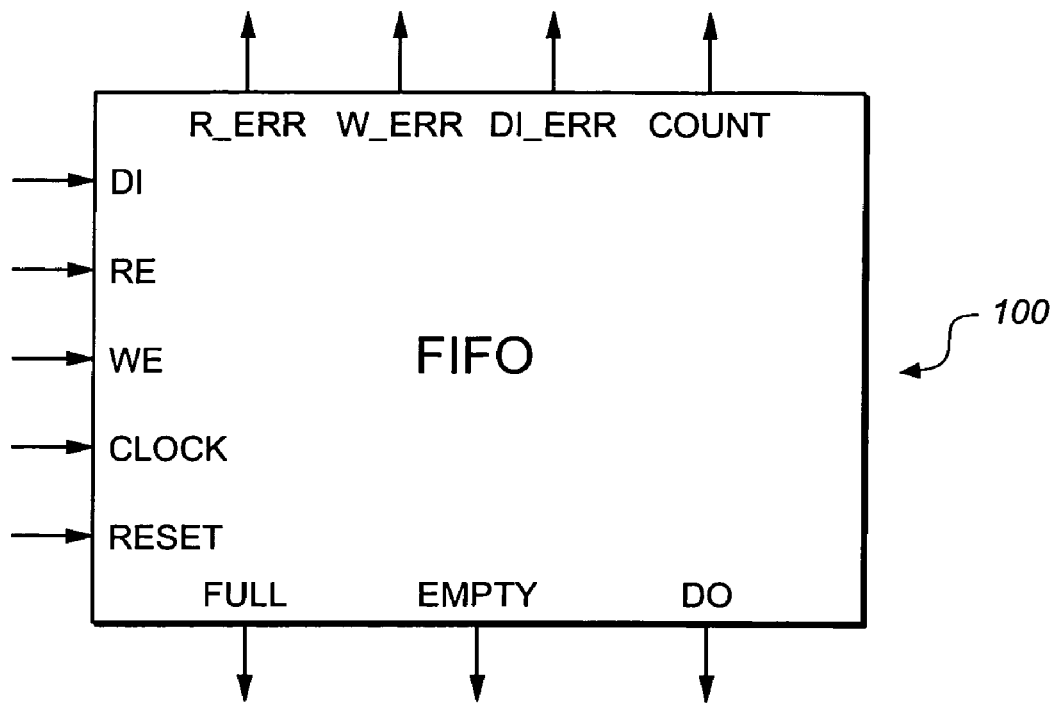
FIG._1
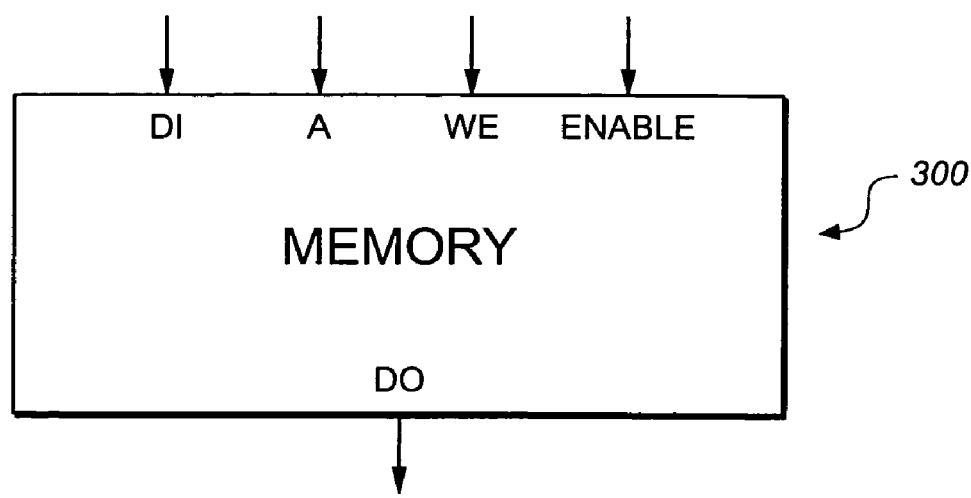
FIG._3

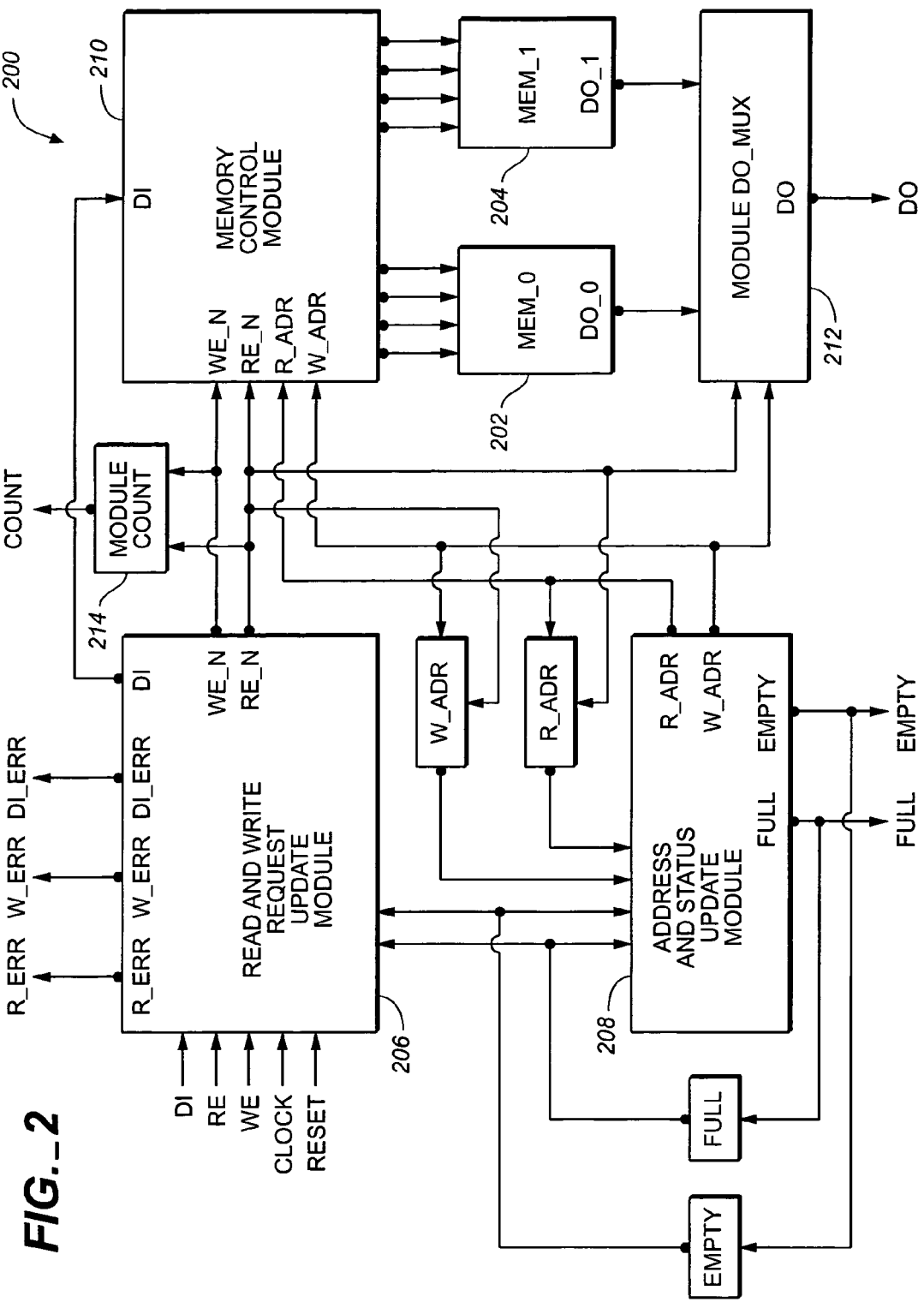
FIG._2

FIFO MEMORY WITH SINGLE PORT MEMORY MODULES FOR ALLOWING SIMULTANEOUS READ AND WRITE OPERATIONS

FIELD OF THE INVENTION

The present invention generally relates to first-in first-out (FIFO) memories, and particularly to a FIFO memory with single port memory modules for allowing simultaneous read and write operations.

BACKGROUND OF THE INVENTION

FIFO (first-in first-out) memories have numerous applications in VLSI (very large-scale integration) circuits and electronic systems and are well known in theory and practice of computing. For example, a FIFO memory may act as a buffer between two circuits which operate asynchronously to each other. In this case, input data are simultaneously written into the FIFO memory at one frequency and independently read out of the FIFO memory at a different frequency.

FIFO memories may be implemented and used in software or hardware. Conventionally, a dual port RAM (random access memory) is used when implementing a FIFO memory, which allows read and write operations to be performed independently within the RAM. However, one disadvantage of the dual port RAM is that it is almost twice the size of a single port RAM having the same capacity. In contrast, a single port RAM can perform only one operation (read or write) at a time. Thus, a straightforward use of a single port RAM inside a FIFO memory may lead to an unwanted limitation that only one operation may be performed within the FIFO memory at any given time.

Thus, it would be desirable to provide a FIFO memory with single port memory modules (e.g., single port RAMs, and the like) that may allow simultaneous read and write operations. Such a FIFO memory would occupy a smaller chip area than a FIFO memory using a dual port memory module (e.g., a dual port RAM).

SUMMARY OF THE INVENTION

Accordingly, the present invention is directed to a FIFO memory with single port memory modules that allow simultaneous read and write operations. In an exemplary aspect of the present invention, a method for employing a FIFO memory with single port memory modules to perform simultaneous read and write operations includes the following steps: (a) providing a first single port memory module for an even address of a read or write operation; (b) providing a second single port memory module for an odd address of a read or write operation; (c) alternating even address and odd address; and (d) when both a read request and a write request reach either the first single port memory module or the second single port memory module at a clock cycle, fulfilling the read request at the current clock cycle and fulfilling the write request at the next clock cycle.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 shows an exemplary synchronous FIFO memory realizing a FIFO queue;

FIG. 2 shows a FIFO memory with single port memory modules that may allow simultaneous read and write operations in accordance with an exemplary embodiment of the present invention; and FIG. 3 shows an exemplary embodiment of the single port memory modules illustrated in FIG. 2.

DETAILED DESCRIPTION OF THE INVENTION

Reference will now be made in detail to the presently preferred embodiments of the invention, examples of which are illustrated in the accompanying drawings.

The present invention relates to a memory device having single port memory modules, which realizes a synchronous first-in first-out (FIFO) queue that allows simultaneous read and write operations. The memory device of the present invention may occupy smaller chip real estate than a conventional FIFO memory based on a dual port memory module and may operate based on a single clock signal.

In a preferred embodiment, the FIFO memory of the present invention is based on modeling of a dual port memory module by means of two identical single port memory modules with half capacity (a first memory module that corresponds to the even read or write internal addresses and a second one that corresponds to the odd read or write internal addresses). The modeling of a dual port memory module in the case of the FIFO implementation may be based on the alternating of the two sequences of internal addresses for reading and for writing appear to be alternating, i.e. after an even internal address for reading and writing, the following address is an odd address, and vice versa. The present FIFO memory may divide the whole virtual FIFO memory into two parts: a first part for storing data for even addresses, and a second part for storing data for odd addresses.

In a preferred embodiment, when reading and writing requests arrive simultaneously to an address (e.g., an even address), the present FIFO memory may ensure that at the next clock cycle there are no reading or writing request to the same address (e.g., that even address). In the case of the foregoing described conflict, the present FIFO memory may preferably fulfill the reading request at the current clock cycle and may fulfill the writing request at the next clock cycle. Thus, the present FIFO memory may have the ability to resolve possible conflicts (when request to read and request to write both arrive to the same memory) by postponing the writing request to the next clock cycle. As far as both writing and reading addresses alternate (i.e. make changes from being even to being odd, and vice versa), the postponed writing may be performed at the next clock cycle.

Referring now to FIG. 1, an exemplary synchronous FIFO memory 100 realizing a FIFO queue is shown. The FIFO memory 100 may perform two operations: reading and writing data and may have a single clock for both operations. One of the essential requirements for a FIFO memory such as the FIFO memory 100 and the like is that written data can be read out of the FIFO memory only in the order they were successfully (i.e. with FULL=0 at that moment) written.

As shown, input data arrived to a port DI (data_in) is written into the FIFO internal memory if a write enable flag WE=1 and a status flag FULL=0. The FIFO status flag FULL=1 indicates that no more available spaces are left in the internal memory and the current writing request is thus ignored. In such a case, an optional (i.e. user defined) flag W_ERR (write error) may be set to 1 (in order to indicate the gap in data inputs) and DI_ERR (data input error) may be set to the missing data DI.

If a read enable flag RE=1 and a status flag EMPTY=0, then the FIFO memory 100 may output data out DO preserving the order in which the data were previously written. The optional status flag EMPTY=1 indicates that the FIFO internal memory is empty or all previously written entries have been outputted (i.e. have been read) at the current clock cycle. If EMPTY=1, then arriving request RE=1 is ignored by the FIFO memory 100 and an optional flag R_ERR (read error) is set to 1 to indicate this kind of error.

A user may also configure an auxiliary port COUNT that outputs the number of written but not read entries in the FIFO internal memory or outputs some present amount of the most significant bits of this counter.

FIG. 2 shows a FIFO memory 200 with single port memory modules 202, 204 that may allow simultaneous read and write operations in accordance with an exemplary embodiment of the present invention. The FIFO memory 200 may include the single port memory modules 202, 204, a read and write request update module 206, an address and status update module 208, a memory control module 210, a module DO_MUX 212, and a module COUNT 214. The above indicated internal FIFO modules and their functions will be described in more detail below.

A. Single Port Memory Modules

The internal memory used in the FIFO memory 200 is the single port memory modules 202, 204 such as standard single port RAMs, and the like. For example, the single port memory modules 202, 204 may be SRAMs (static random access memories), DRAMs (dynamic random access memories), or the like. FIG. 3 shows an exemplary embodiment 300 of the single port memory modules 202, 204 illustrated in FIG. 2. The single port memory module 300 may be represented by a memory array M including mem_capacity number of words, each having an equal length of mem_dim. Each word may be stored in the single port memory module 300 at some location, or address A, where A is a binary word of the width adr_width=log mem_capacity. Preferably, when mem_capacity is not equal to some power of 2, the address width is equal to the least integer which is greater than the logarithm (on the base 2) of mem_capacity.

The single port memory module 300 may function in discrete time units, or clock cycles, t=0, 1, 2, 3, . . . . At a given time, the single port memory module 300 may be in an active (enable) or inactive (disable) state, depending on the state of the ENABLE flag. When the single port memory module 300 is inactive (i.e. ENABLE=0), then the single port memory module 300 keeps the value of the DO output unchanged. When the single port memory module 300 is active (i.e. ENABLE=1), the single port memory module 300 may perform either READ operation or WRITE operation.

A READ operation for a given address A provides a word DO (data_out) from the single port memory module 300 that is stored in the single port memory module 300 at the address A, i.e. DO=MEMORY[A]. A WRITE operation for a given address A and given word DI (data_n) provides writing the word DI at the address A, i.e. MEMORY[A]=DI. If the address A contains a word, that word is erased. The type of operation to be performed is determined by auxiliary flag WE (write_enable). In other words, if WE=1 then operation WRITE is performed, otherwise a READ operation is performed.

B. Read and Write Request Update Module

This module 206 performs an update of the RE (read enable) and WE (write enable) input flags in order to avoid possible reading from the empty FIFO memory (i.e. when EMPTY=1) or writing into the full FIFO memory (i.e. when FULL=1). In addition, the two optional output flags R_ERR (reading error) and W_ERR (writing error) along with output data DI_ERR (data input error) are computed in this module 206.

If RE=1 and EMPTY=1, then RE_N=0 and at the next clock cycle the FIFO memory 200 outputs R_ERR=1, indicating that reading from FIFO memory 200 was missing. If EMPTY=0, then RE_N=RE and R_ERR=0 and the FIFO memory 200 continues to fulfill the reading request.

Similarly, if WE=1 and FULL=1, then WE_N=0 and the current input data DI is missing for writing. Thus, at the next clock cycle, the FIFO memory 200 outputs W_ERR=1 and DI_ERR=DI to designate that the data DI was missing and there is a gap in writing. If FULL=0, then WE_N=WE, W_ERR=0, DI_ERR=0, and the FIFO memory 200 continues to fulfill the current writing request.

C. Address and Status update Module

This module 208 plays an important role in the FIFO memory 200. The module 208 updates the values of address registers R_ADR (read address) and W_ADR (write address) that are used in the FIFO memory 200 for access to the internal memory. Actual switching of these address registers occurs when RE_N=1 and WE_N=1, respectively.

To update the addresses is to increment and switch the addresses at the appropriate time (i.e. when RE_N=1 or WE_N=1). Updating the address is especially simple when mem_capacity is a power of 2 and adr_width is equal to logarithm (on base 2) of mem_capacity. The status flags (EMPTY and FULL) update may be performed simultaneously and in parallel with the address update. Note that if the optional module COUNT 214 is instantiated inside the FIFO memory 200, then the status flags computation may be moved to the module COUNT 214 and performed in parallel with COUNT computation.

(1) Power of 2 Case

When mem_capacity is a power of 2 and adr_width=log mem_capacity (on base 2), R_ADR and W_ADR registers are preferably declared as having a width of adr_width +1, where the most significant bit is an extra bit to hold a possible carry when performing increment of adr_width bit binary numbers representing addresses values. Denote these extra bits as R_carry and W_carry so that R_ADR=(R_carry, RA) and W_ADR=(W_carry, WA), where RA and WA include remaining bits and have the width equal to adr_width. In other words, these values are sent (through wires with the width of adr_width) to the module MEM_CONTROL 210 for further usage.

The FULL and EMPTY flags computation is described as follows. Note that if R_ADR and W_ADR are computed (incremented) as integers rather than arithmetically by modulo $$2^{adr\_width+1}=2 \text{ mem\_capacity},$$

then the following inequality $$(W\_ADR-R\_ADR) \leq 2^{adr\_width}=\text{mem\_capacity} \quad (*)$$

may be true as far as this difference is equal to the number of entries inserted into the FIFO memory 200 and, thus, cannot exceed mem_capacity by the definition of FIFO functioning. This implies that as far as RA=WA, then flags EMPTY and FULL may be determined easily: if R_carry=W_carry, then EMPTY=1, otherwise FULL=1.

(2) Arbitrary Case

When mem_capacity is not a power of 2, a reduction by mod_capacity has to be performed in parallel with the address incrementing. Simultaneously with this, an auxiliary flag and is recomputed:

if $R\_ADR$ is equal to mem_capacity−1, then
$R\_ADR=0$ and $ind=ind-1$, otherwise
$R\_ADR=R\_ADR+1$;

if $W\_ADR$ is equal to mem_capacity−1, then
$W\_ADR=0$ and $ind=ind+1$, otherwise
$W\_ADR=W\_ADR+1$;

As in the foregoing described case, the inequality (*) implies that ind=0 or ind=1. For FIFO flags, when R_ADR=W_ADR, if ind=1, then FULL=1, and if ind=0, then EMPTY=1.

D. Memory Control Module

The memory control module 210 is the main module of the FIFO memory 210. The memory control module 210 controls distribution of reading and writing requests among the even and odd addresses and performance of the postponed (by one clock) writing.

Denote the last (least significant) bit in R_ADR as R_bit and in W_ADR as W_bit. The remaining parts of the address (of the width adr_width−1) are denoted as R_A and W_A, respectively, i.e., R_ADR=(R_A, R_bit) and W_ADR=(W_A, W_bit). In other words, the addresses R_A and W_A are obtained as integers by dividing the addresses R_ADR and W_ADR by 2, while the bits R_bit and W_bit are the remainders.

These bits R_bit and W_bit may indicate which internal single port memory module (left one MEM_0 202 or right one MEM_0 204) will fulfill a current request of reading or writing.

Port values may be computed as follows. Flags ENABLE_0 and ENABLE_1 have default value 0.

(1) Reading

Reading is performed unconditionally. That is, if RE_N=1, then in the case R_bit=0,
ENABLE_0=1,
WE_0=0,
A_0=R_A and in the case R_bit=1,
ENABLE_1=1,
WE_1=0,
A_1=R_A.

(2) Writing

First, a CONFLICT bit is computed: CONFLICT=1 if and only if RE_N=1, WE_N=1 and R_bit=W-bit.

If CONFLICT=0, then (similar to the above) in the case W_bit=0,
ENABLE_0=1,
WE_0=1,
A_0=W_A,
DI_0=DI, and in the case W_bit=1,
ENABLE_1=1,
WE_1=1,
A_1=W_A,
DI_1=DI.

If CONFLICT=1, the W_bit, W_A and data DI are memorized in registers, and a next auxiliary flag is set to 1 and memorized in register as well. The next flag value equal to 1 indicates that there is a postponed (delayed) writing from the previous clock cycle. The delayed value of W_bit, W_A and data DI may be referred to by adding a letter D.

(3) Postponed Writing

As described above, incoming addresses for reading as well as incoming addresses for writing alternate their evenness, changing from being even to being odd and vice versa. Thus, if there is a conflict in assessing to one of 2 internal memories, then at the next clock cycle the postponed writing may be performed successfully.

If next=1 (regardless the current value of the CONFLICT flag value), the following values may be set for the case W_bit_D=0:
ENABLE_0=1,
WE_0=1,
A_0=W_A_D,
DI_0=DI_D, and for the case W_bit_D=1 the following values may be set:
ENABLE_1=1,
WE_1=1,
A_1=W_A_D
DI_1=DI_D.

In a preferred embodiment, due to the address alternating, the inquiry to set the ENABLE flag to 1 (for the left memory module MEM_0 202 as well as for the right memory module MEM_1 204) can come only once at a time and from only one of three requests: reading, writing and postponed writing.

E. Module DO_MUX

This module 212 is a data output selection module. The module 212 takes into account current values R_bit and RE_N, selects from two values DO_0 and DO_1 the correct value DO, and holds the correct value DO until the next reading request comes.

F. Module COUNT

This module 214 is optional (i.e. user defined) and may output count_width most significant bits of the COUNT 214. These bits may indicate (though approximately) what fraction (or part) of memory is currently occupied with unread entries. The number count_width may also be user predefined and may reflect the level of accuracy in memory occupancy measurement required by a user. For instance, if count_width=2, then the memory occupancy is measured in the whole quarters. The counter COUNT 214 itself may be exactly equal to the number of current entries (i.e. not read yet) in the FIFO memory 202.

Updating the counter 214 may be performed as follows: (a) if RE_N=1 and WE_N=0, then its value is decremented; (b) if RE_N=0 and WE_N=1, then its value is incremented; and (c) in all other cases, its value remains unchanged.

Computation of the FULL and the EMPTY status flags may be performed in this module 214 in a way similar to the computation described above along with the address and status update module 208, i.e. with the aid of the additional bit for the carry (in the case of power 2) or with the aid of the additional 1-bit counter ind (in general case).

It is understood that FIG. 2 is intended as an example of a FIFO memory in accordance with the present invention and not as an architectural limitation to the present invention. Those of ordinary skill in the art will appreciate that various combinations and arrangements may be employed without departing from the scope and spirit of the present invention.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A FIFO memory with single port memory modules for allowing simultaneous read and write operations, comprising:
   a first single port memory module for an even address of an operation;
   a second single port memory module for an odd address of said operation, wherein said even address and said odd address alternate;
   a memory control module, communicatively coupled to said first single port memory module and said second single port memory module, for controlling distribution of reading and writing requests between said even address and said odd address and performance of postponed writing;
   a data output selection module, communicatively coupled to said first single port memory module and said second single port memory module, for selecting a value between a first output value from said first single port memory module and a second output value from said second single port memory module and holding said value until a next read request comes;
   a read and write request update module, communicatively coupled to said memory control module and said data output selection module, for updating RE (read enable) and WE (write enable) input flags to avoid reading from empty said first single port memory module and said second single port memory module and writing into full said first single port memory module and said second single port memory module; and
   an address and status update module, communicatively coupled to said read and write request update module, said memory control module and said data output selection module, for updating values of address registers R_ADR (read address) and W_ADR (write address) used for access to said first single port memory module and said second single port memory module.

2. The FIFO memory of claim 1, wherein said operation is selected from a group consisting of reading and writing.

3. The FIFO memory of claim 1, wherein said first single port memory module and said second single port memory module are identical and are of half capacity.

4. The FIFO memory of claim 3, wherein said first single port memory module and said second single port memory module are RAMs (random access memories).

5. The FIFO memory of claim 1, wherein said memory control module uses a least significant bit in said address register R_ADR to indicate which of said first single port memory module and said second single port memory module is to perform a current reading request, and uses a least significant bit in said address register W_ADR to indicate which of said first single port memory module and said second single port memory module is to perform a current writing request.

6. The FIFO memory of claim 1, wherein when both a read request and a write request reach one of said first single port memory module and said second single port memory module at a first clock cycle, said read request is fulfilled at said first clock cycle and said write request is fulfilled at a second clock cycle immediately following said first clock cycle.

7. The FIFO memory of claim 1, wherein when mem_capacity is a power of 2, adr_width=log mem_capacity (on base 2), and RA=WA, FULL and EMPTY flags of said address and status update module are determined as follows: (a) when R_carry=W_carry, then EMPTY=1; (b) otherwise, FULL=1.

8. The FIFO memory of claim 1, wherein when mem_capacity is not a power of 2 and R_ADR=W_ADR, FULL and EMPTY flags of said address and status update module are determined as follows: (a) when ind=1, then FULL=1; (b) when md=0, then EMPTY=1.

9. The FIFO memory of claim 1, further comprising a counter module for outputting count_width most significant bits of said counter module.

* * * * *